United States Patent
Tawa et al.

(10) Patent No.: US 6,469,838 B2
(45) Date of Patent: Oct. 22, 2002

(54) ILLUMINATION DEVICE HAVING LIGHT INTENSITY DISTRIBUTION CONVERTING ELEMENTS

(75) Inventors: Fumihiro Tawa, Kawasaki (JP); Shinya Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/046,219

(22) Filed: Jan. 16, 2002

(65) Prior Publication Data

US 2002/0067549 A1 Jun. 6, 2002

Related U.S. Application Data

(62) Division of application No. 09/365,824, filed on Aug. 3, 1999, now Pat. No. 6,356,395.

(30) Foreign Application Priority Data

Sep. 14, 1998 (JP) .......................................... 10-260281

(51) Int. Cl.⁷ .......................... G02B 13/08; G02B 27/30
(52) U.S. Cl. ........................ 359/668; 359/641; 359/642; 359/708; 359/719; 369/112.23
(58) Field of Search ................................. 359/668, 641, 359/648, 637, 642, 708, 718, 719, 799, 800; 369/112.23

(56) References Cited

U.S. PATENT DOCUMENTS

| | | | | |
|---|---|---|---|---|
| 4,545,653 A | | 10/1985 | Brenden et al. ............. | 359/719 |
| 4,904,062 A | | 2/1990 | Morishita et al. ........... | 359/708 |
| 5,148,317 A | * | 9/1992 | Foresi ......................... | 359/641 |
| 5,442,615 A | | 8/1995 | Ohsato et al. .............. | 369/100 |
| 5,467,335 A | | 11/1995 | Braat ...................... | 369/112.23 |
| 5,499,262 A | | 3/1996 | Nakata ........................ | 372/108 |
| 5,553,174 A | | 9/1996 | Snyder ........................ | 385/15 |
| 5,572,367 A | * | 11/1996 | Jung et al. .................. | 359/708 |
| 6,014,260 A | | 1/2000 | Godard et al. ............. | 359/719 |
| 6,356,395 B1 | * | 3/2002 | Tawa et al. ................. | 359/642 |

FOREIGN PATENT DOCUMENTS

| | | |
|---|---|---|
| JP | 62-150315 | 7/1987 |
| JP | 63-188115 | 8/1988 |
| JP | 3-75612 | 3/1991 |
| JP | 3-92815 | 4/1991 |
| JP | 6-223401 | 8/1994 |
| JP | 2900648 | 3/1999 |

OTHER PUBLICATIONS

French Search Report, Sep. 18, 2000.

* cited by examiner

*Primary Examiner*—Loha Ben
(74) *Attorney, Agent, or Firm*—Armstrong, Westerman & Hattori, LLP

(57) ABSTRACT

A light intensity distribution converting device is formed by a transparent body having a first curved surface, a second curved surface, and an outer circumferential surface extending between the first and second curved surfaces. One of first and second surfaces has a concave surface configuration and the other has a convex surface configuration. Diverging light is made incident to the first curved surface, for example. The light intensity distribution of light made incident to the body from first curved surface is different from that of light emerging the body from the second curved surface, due to refractions at the first and second curved surfaces. The light intensity distribution converting device can be used as a collimator lens or an objective lens in an optical data storing apparatus.

3 Claims, 18 Drawing Sheets

F: 3.0 mm
T: 3.5 mm

F: 6.0 mm
T: 3.5 mm

F: 8.0 mm
T: 3.5 mm

T: 2.5 mm
F: 6.0 mm

T: 3.0 mm
F: 6.0 mm

T: 3.5 mm
F: 6.0 mm

X-AXIS DIRECTION

Y-AXIS DIRECTION $Wb_1 = Wb_2$

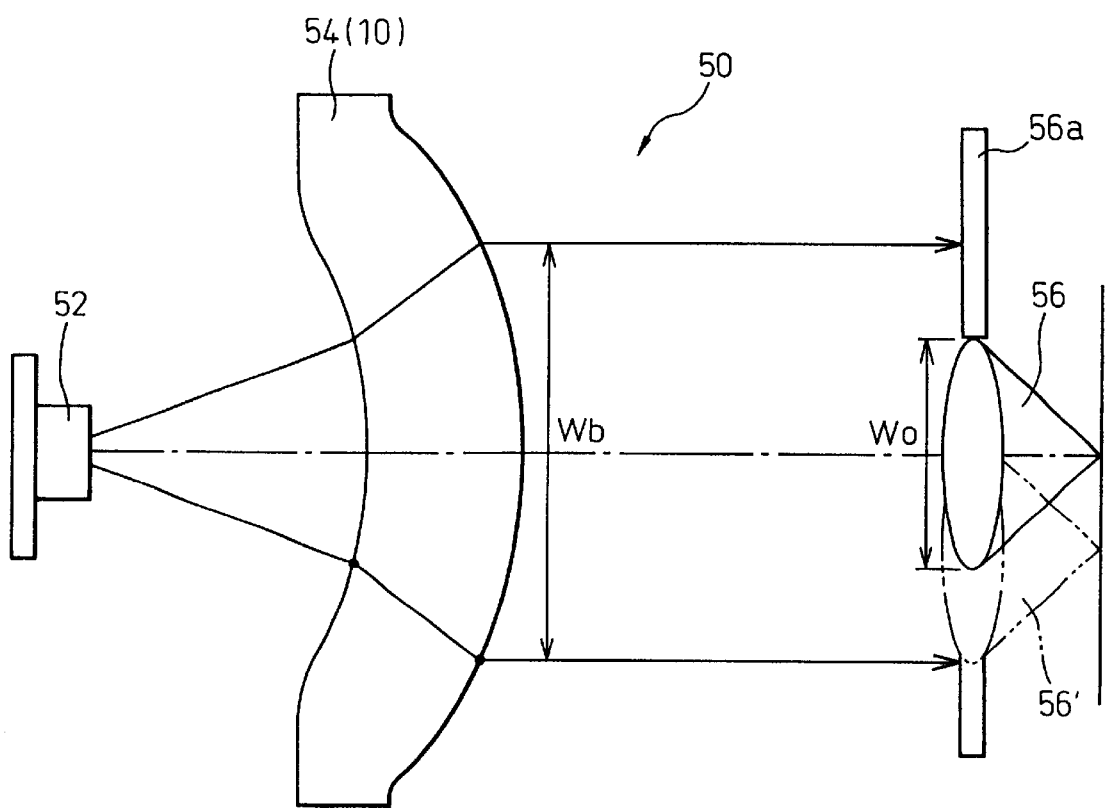

ILLUMINATION DEVICE HAVING LIGHT INTENSITY DISTRIBUTION CONVERTING ELEMENTS

This application is a division of a prior application Ser. No. 09/365,824, filed Aug. 3, 1999, now U.S. Pat. No. 6,356,395.

BACKGROUND OF THE INVENTION

1. Field of the Invention

The present invention relates to a light intensity distribution converting device which converts the intensity distribution of incident light to output the converted light, and to an optical data storage apparatus using the same.

2. Description of the Related Art

An optical system for an optical data storage apparatus comprises a laser source, a collimator lens, and an objective lens. In such a system, the diameter of a beam spot is required to be small to enhance the density of an optical disc apparatus, and an increase in the quantity of light is required to improve the transmission speed.

To minimize the spot diameter in conventional optical systems, attempts have been directed to an increase in the numerical aperture NA of an objective lens or reduction of the wavelength of the laser. However, an increase in the NA of an objective lens tends to enhance aberrations. Shortening of the laser wavelength relies upon an improvement of the laser source proper and cannot be realized by improving the optical disc apparatus. Also, the quantity of light can be increased only by a realization of a higher power laser.

In optical theory, it is known that when condensing a pencil of light, a pencil of light having a uniform light intensity distribution can form a beam spot diameter smaller, and close to the diffraction limit, than a pencil of light having a Gaussian light intensity distribution. This effect is equivalent to a provision of a spot diameter, using a laser whose wavelength is shorter than that of the laser being used by several tens of nm, for the objective lens of the same NA.

In general, since the light intensity on a wave front of the pencil of light has a Gaussian distribution, the aperture of an objective lens upon which the light is made incident is restricted. Therefore, efforts have been made to minimize the beam spot diameter by making only the light in the vicinity of an optical axis, whose intensity distribution can be considered approximately uniform, incident upon the objective lens. In the attempts, naturally, no light outside the aperture diameter is used, and therefore, the utilization efficiency of light of the light source is reduced. If the aperture diameter to be used is expanded to cover light whose intensity distribution cannot be considered uniform in order to increase the light utilization efficiency, the beam spot diameter will be then larger than that for the uniform light intensity distribution. As can be understood from the foregoing, the uniformity of the light intensity is not compatible with the reduction of loss of the quantity of light.

A light intensity distribution converting device which converts collimated light having a Gaussian intensity distribution into collimated light having a uniform light intensity distribution has been proposed in Japanese Patent Application No. 10-57003 filed prior to the present application. This light intensity distribution converting device can be disposed between a collimator lens and an objective lens in an optical disc apparatus which is comprised of a laser source, the collimator lens, and the objective lens. The objective lens receives parallel light beams having a uniform light intensity distribution, so that a small diameter of a beam spot can be obtained. However, this light intensity distribution converting device is an additional element in the optical disc apparatus.

Japanese Unexamined Patent Publication No. 63-188115 discloses a beam forming optical apparatus in which light having a Gaussian light intensity distribution can be converted to light having a uniform light intensity distribution by two lenses. In this prior art, the two lenses are constructed so as not to satisfy the sine condition. However, this requires a small machining tolerance. Therefore, to reduce the tolerance, one of the two lenses is designed to dissatisfy the sine condition and the other is designed to satisfy the sine condition. In this solution in which the light intensity distribution is converted using spherical aberrations, a wave front aberration is inevitably produced, and therefore, the optical device cannot be used as a small optical element for an optical disc apparatus or the like.

SUMMARY OF THE INVENTION

An object of the present invention is to provide a light intensity distribution converting device which can convert a given light intensity distribution to a desired one, so that wave front aberrations and the beam spot diameter can be reduced, and also to provide an optical data storage apparatus using the light intensity distribution converting device.

According to the present invention, there is provided a light intensity distribution converting device comprising a body having a central axis, a first curved surface transversely extending with respect to the central axis, a second curved surface transversely extending with respect to the central axis, and an outer circumferential surface extending between said first and second curved surfaces, one of the first and second curved surfaces having a concave surface configuration at approximately a center portion thereof, the other having a convex surface configuration at or near a center portion thereof, at least one of incident light and emerging light is diverging or converging light and the first and second curved surfaces being formed such that the light intensity distribution of incident light, due to refractions at the first and second curved surfaces is different from that of emerging light while the light passes from the first curved surface to the second curved surface.

Using this light intensity distribution converting device, emerging light having a uniform intensity distribution can be obtained from incident light having a Gaussian intensity distribution. In an optical data storage apparatus according to the present invention, the light intensity distribution converting device is used as a collimator lens and/or an objective lens. For example, if the light intensity distribution converting device is used as a collimator lens for an optical disc apparatus, the objective lens of the device receives light having a uniform intensity distribution, so that a smaller beam spot diameter can be obtained. If the light intensity distribution converting device is used as an objective lens for an optical storage apparatus, the objective lens has functions to convert the light intensity distribution and to condense the light.

BRIEF DESCRIPTION OF THE DRAWINGS

The present invention will become more apparent from the following description of the preferred embodiments, with reference to the accompanying drawings, in which:

FIG. 17 is a view showing a modified example of an optical disc apparatus;

DESCRIPTION OF THE PREFERRED EMBODIMENTS

Figure 1:
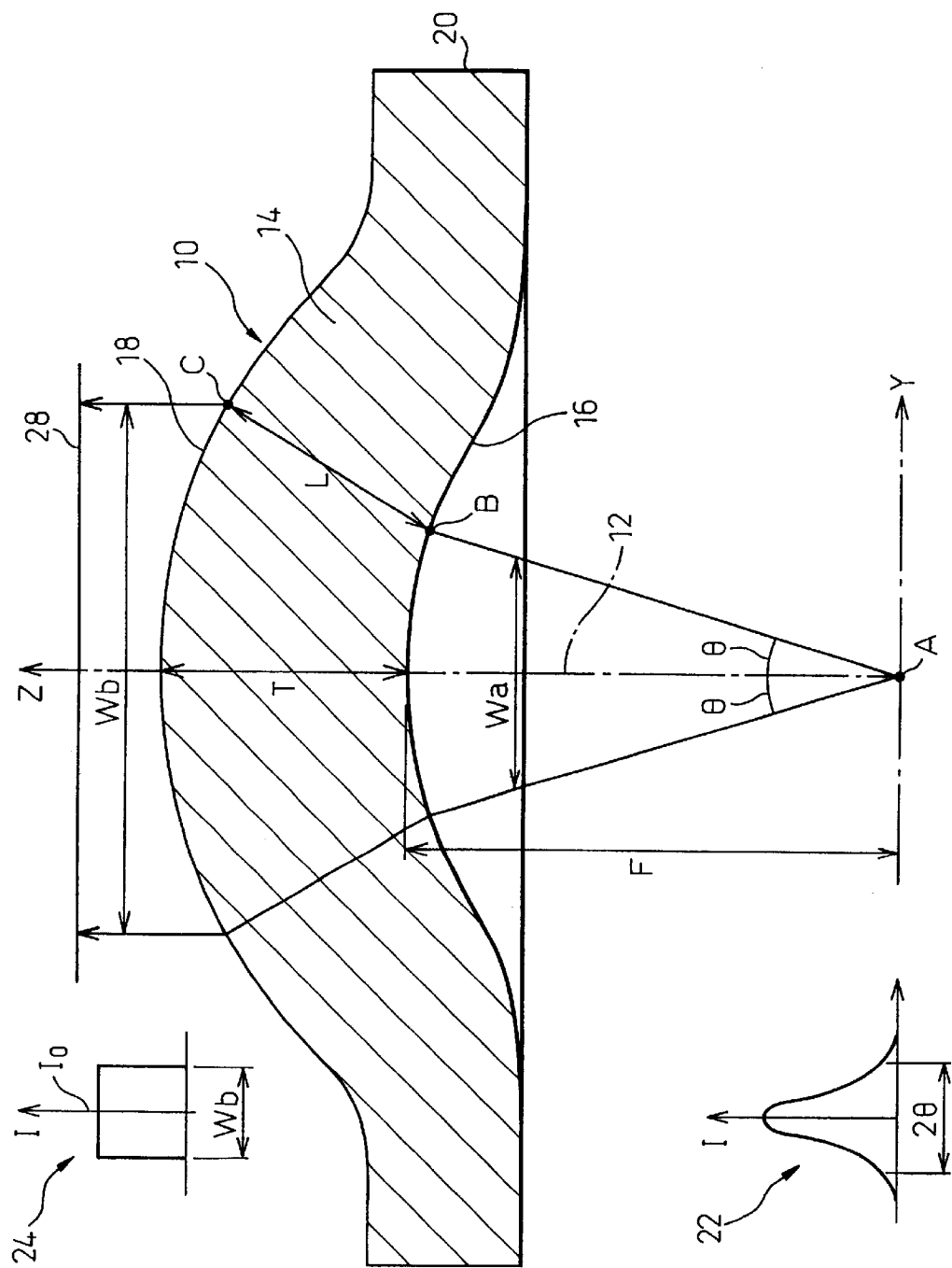
FIG. 1 is a cross-sectional view of a light intensity distribution converting device in accordance with a first embodiment of the present invention.

Preferred embodiments of the present invention will now be explained below. FIG. 1 shows a first embodiment of the light intensity distribution converting device 10 according to the present invention and FIG. 2 shows a light intensity distribution converting device 10 similar to the light intensity distribution converting device 10 shown in FIG. 1 and a plurality of small optical paths extending therethrough.

Figure 2:
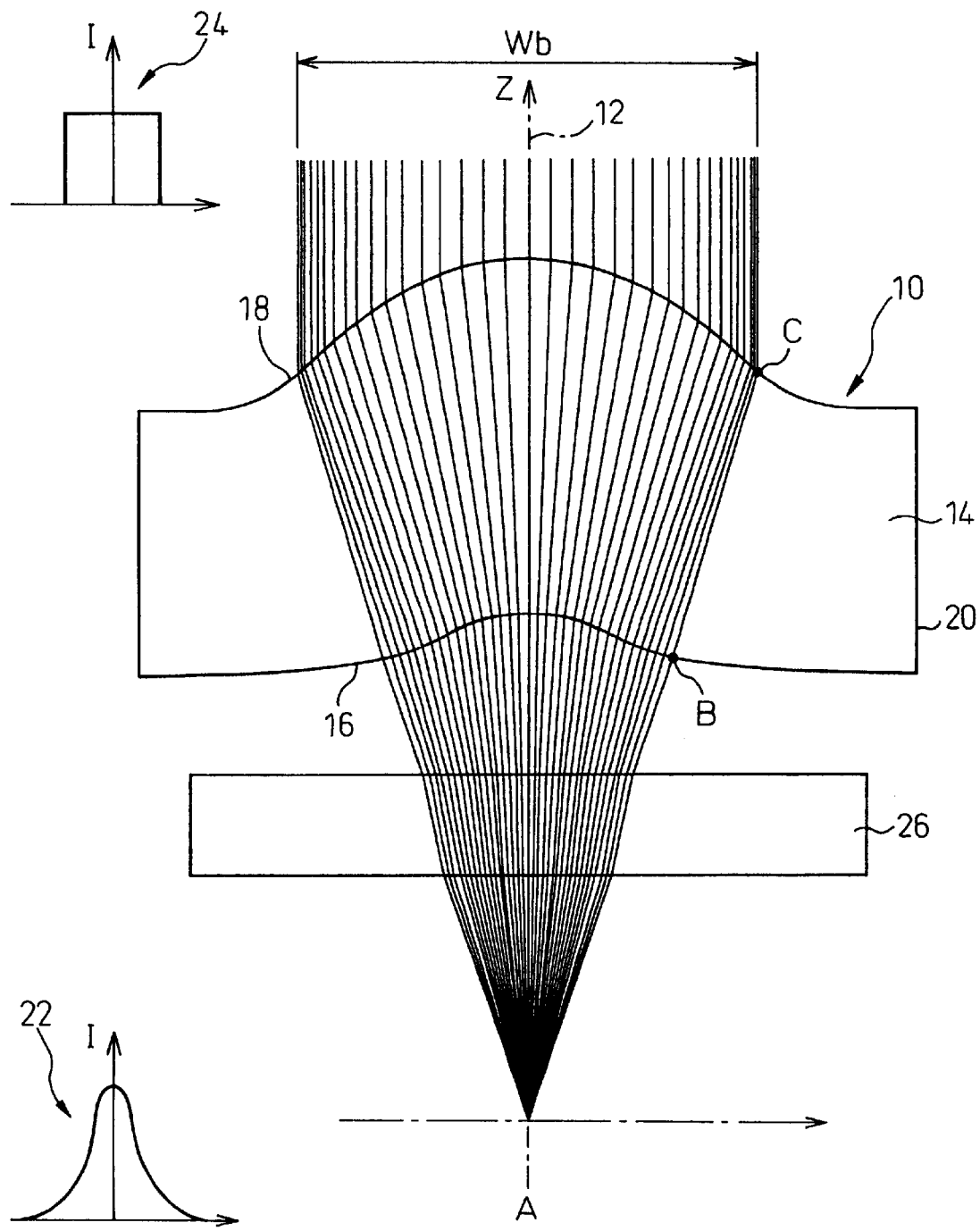
FIG. 2 is a view of a light intensity distribution converting device similar to the light intensity distribution converting device shown in FIG. 1 and showing a plurality of small optical paths extending therethrough.

In FIGS. 1 and 2, the light intensity distribution converting device 10 comprises a transparent body 14 having a central axis 12. The body 14 is made of a transparent material, such as glass, having an isotropic refractive index. The body 14 has a first curved surface 16 transversely extending with respect to the central axis 12, a second curved surface 18 located on the side opposite to the first curved surface 16 and transversely extending with respect to the central axis 12, and an outer circumferential surface 20 extending between the first curved surface 16 and the second curved surface 18.

In FIGS. 1 and 2, point A represents a radiation point, point B represents an incident point of light onto the first curved surface 16, and point C represents a light emerging point on the second curved surface 18. In these figures, the Z-axis passing through the point A defines the optical axis directions and the Y-axis and the X-axis correspond to directions parallel to and perpendicular to the sheet of the drawing, respectively. T designates the thickness of the light intensity distribution converting device 10 on the optical axis, and L designates the length of a specific optical path in the light intensity distribution converting device 10. Point A can be, for example, a laser, which radiates diverging light having Gaussian light intensity distribution 22 which is in rotation-symmetry with respect to the Z-axis. The light intensity distribution converting device 10 is an optical device, having a rotation—symmetric shape regarding the Z-axis, and a refractive index n. In FIG. 2, a flat plate 26 whose refractive index is n' is disposed perpendicularly to the Z-axis and between the radiation point A and the light intensity distribution converting device 10. The flat plate 26 can be used as a glass cover for the laser.

The first curved surface 16 is defined by a generally shallow rounded concave surface and the second curved surface 18 is defined by a generally rounded convex surface. The inclinations of the first and the second curved surfaces 16 and 18 are 0 at the center of the body 14, and gradually increase with the measuring points moving from the center of body to the radially outer portion thereof, and reach certain values and then gradually decrease. Namely, the first and the second curved surfaces have inflection points on their inclinations. (see FIG. 5 which will be discussed hereinafter).

In the light intensity distribution converting device 10, the light intensity distribution of light emitted therefrom is different from that of light made incident thereupto, due to refractions of light caused at the first curved surface 16 and the second curved surface 18. In the embodiment, diverging light having a Gaussian light intensity distribution 22 is made incident to the body 14 at the first curved surface 16, and passes through the body 14. The light emerges the body 14 from the second curved surface 18 as parallel light having a uniform light intensity distribution 24.

The inclination of the second curved surface 18 is determined such that the light emerging the body from the point C travels in parallel with the Z-axis. The optical path lengths, taken for small optical paths of the light from the radiation point A to the surface 28 which lie in a plane perpendicular to the Z-axis and which is located beyond the point C are identical to each other. Consequently, this light intensity distribution converting device 10 not only converts the light intensity distribution at the point A, but also serves as a collimator lens.

Wa represents the aperture diameter of incident light upon the light intensity distribution converting device 10, and Wb represents the aperture diameter of the light emerging therefrom. An emerging angle for the incidence aperture diameter Wa at the point A is indicated by θ. Upon designing the light intensity distribution converting device 10, the total quantity of light Q within the incidence aperture diameter Wa (within the emission angle θ) for diverging light having a Gaussian light intensity distribution 22 is obtained. Since the total quantity of incident light is equal to the total quantity of emission light, and since the emission light has a uniform light intensity distribution, we have the following equation where $I_0$ represents the intensity of the emitting light:

$$Q = I_0 \times \pi (Wb/2)^2$$

In other words, the intensity $I_0$ of the emitting light can be obtained by dividing the total quantity of light in the incidence aperture diameter Wa by a required emission aperture area. The uniform light intensity distribution makes it possible to maximize the light utilization efficiency.

Figure 3:
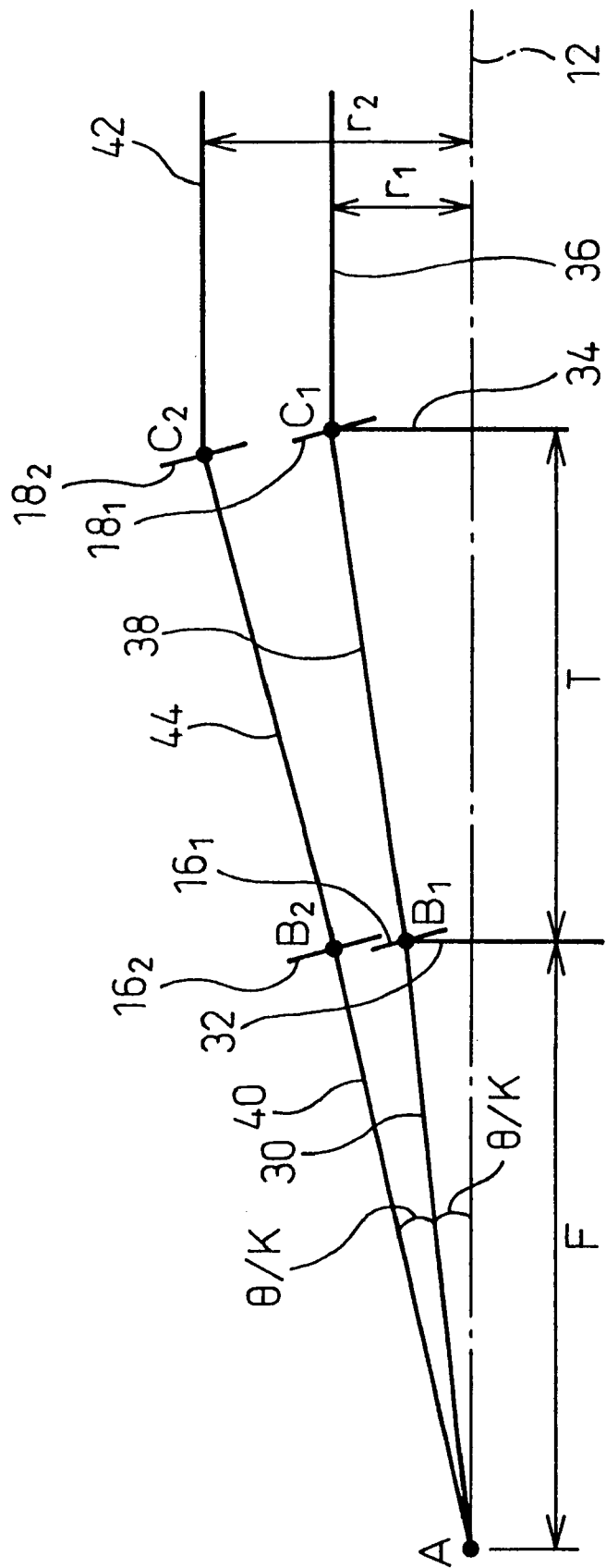
FIG. 3 is an explanatory diagram showing the determination of shapes of first and second curved surfaces of a light intensity distribution converting device.

The design of the first and the second curved surfaces 16 and 18 will be explained below. For the incident light, quantities of the light $Q_1, Q_2, \sim Q_k$ of concentric areas of $\Delta I_1, \Delta I_2, \sim \Delta I_k$ having an identical center which are formed by dividing the radiation angle $\theta$, for example, by k into $\theta/k$, are obtained. Thereafter, concentric areas $\Delta O_1, \Delta O_2, \sim \Delta O_k$ having an identical center, which have the same light quantities as $Q_1, Q_2, \sim Q_k$ respectively, are obtained for the emission light. Hence, the radius $r_k$ of the area $\Delta O_k$ of the emission light corresponding to the area $\Delta I_k$ of the incident light is obtained from the equation of $Q_k = I_0 \times \pi (r^2 k - r^2 k - 1)$ FIG. 3 is an enlarged partial view of FIGS. 1 and 2. The flat plate 26 shown in FIG. 2 is omitted in FIG. 3. It is apparent that if it were present, the calculation below could be carried out likewise, taking the flat plate 26 into consideration. First, the distance F between the radiation point A and the light intensity distribution converting device 10 and the thickness T of the light intensity distribution converting device 10 are set, based upon stored data and tests. A straight line 30 is drawn from the radiation point A at an angle of $\theta/k$ with respect to the central axis 12, and the intersection between the straight line 30 and a line 32 perpendicular to the central axis 12 at the distance F is defined as $B_1$. The intersection between a line 34 perpendicular to the central axis 12 at the distance F+T and a straight line 36 corresponding to the radius $r_1$ is defined as $C_1$. A line 38 connecting the point $B_1$ and $C_1$ is drawn.

The inclination $16_1$ of a micro part of the first curved surface 16, which passes through the point $B_1$, is determined so that the optical path of the incident light corresponds to the line 30, and the optical path of the refracted light corresponds to the line 38. Thereafter, the inclination $18_1$ of a micro part of the second curved surface 18, which passes through the point $C_1$, is determined so that the optical path of the incident light corresponds to the line 38, and the optical path of the refracted light corresponds to the line 36 and is parallel with the central axis line 12.

Next, in the same manner as the previous calculation, points $B_2$ and $C_2$ are determined by drawing a line 40 from the radiation point A at an angle $2\theta/k$ with respect to the central axis line 12, and drawing a line 42 corresponding to the radius $r_1 + r_2$, respectively. Thereafter, a line 44 connecting the points $B_2$ and $C_2$ is drawn. Thus, the inclination $16_2$ of a micro part of the first curved surface 16, which passes through the point $B_1$, and the inclination $18_2$ of a micro part of the second curved surface 18, which passes through the point $C_2$, are determined. It should be noted here that the point $B_2$ is not always located on the line 32, and should be located so as to smoothly connect the inclination $16_1$ and the inclination $16_2$. Likewise, the point $C_2$ is determined so that the inclination $18_1$ and the inclination $18_2$ are smoothly connected. Consequently, the shapes of the first curved surface and the second curved surface can be determined by repeating the above-mentioned calculations.

The distance F between the radiation point A and the light intensity distribution converting device 10 and the thickness T to be predetermined can be calculated, based on the conditions on identical optical path length (to the surface 28 normal to the Z-axis) for light beams having different radiation angle; the inclination at the point C, at which emission light is collimated; and smoothly connected curved surfaces on the B and C sides. In order to meet desired conditions more appropriately, it is possible to perform calculations in which the distance F and thickness T thus obtained are changed.

The result thus obtained is shown in FIG. 2, by way of example, with the optical path for each micro radiation angle. On the emerging side of the second curved surface 18, the distance between the central beams in the vicinity of the optical axis is large and that between the peripheral beams is small. The shape of the light intensity distribution converting device 10 varies considerably depending on the distance F between the radiation point A and the device 10, the thickness T of the device 10, and the emission aperture diameter Wb. This will be explained later referring to FIGS. 9 to 12.

Figure 4:
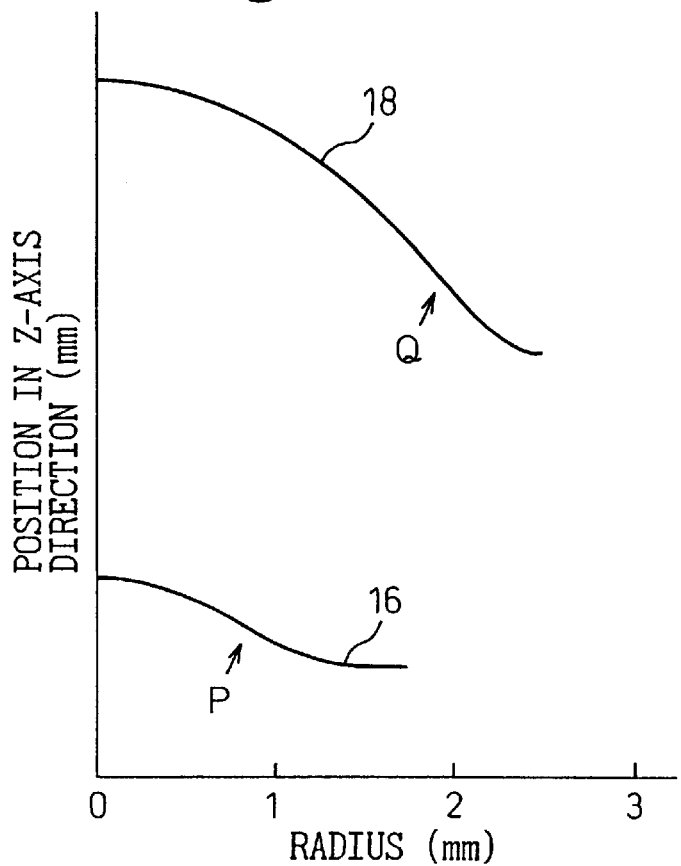
FIG. 4 is a view showing configurations of first and second curved surfaces of a light intensity distribution converting device.
Figure 5:
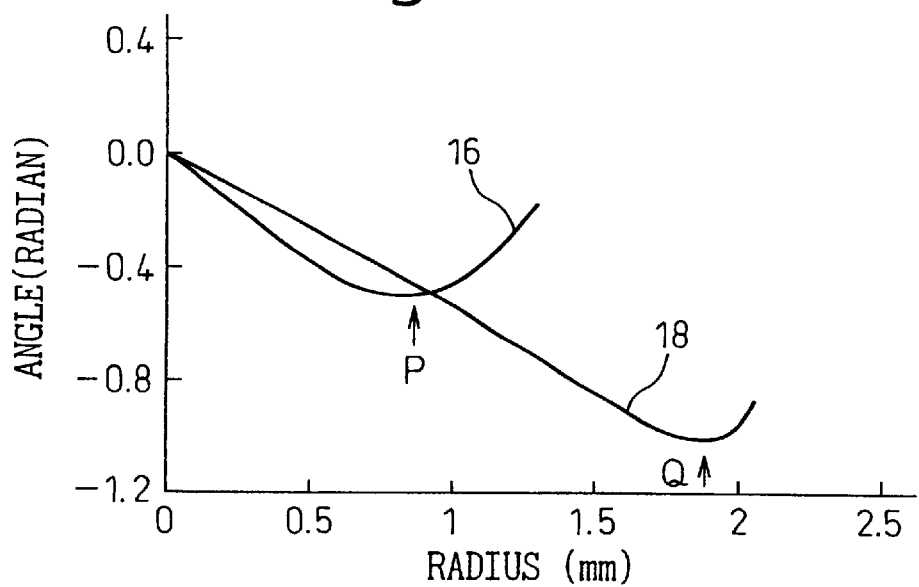
FIG. 5 is a view showing inclinations of first and second curved surfaces of FIG. 4.

FIG. 4 shows the shape of the first and second curved surface 16 and 18 of the light intensity distribution converting device 10 shown in FIG. 2. The radius represents the position in the X-axis or the Y-axis direction. In FIG. 5, the inclinations of the first and second curved surfaces 16 and 18 in FIG. 4 are plotted. These figures show that the first curved surface 16 has an inflection point P of the inclination and the second curved surface 18 has an inflection point Q of the inclination. Also, the inflection points P and Q are indicated at P and Q in FIG. 4. In the light intensity distribution converting device 10, which receives divergent light and emits collimated light and which converts the light intensity distribution, the first and second curved surfaces 16 and 18 have the inflection points P and Q of the inclination respectively. In embodiments which will be explained hereinafter, the first and second curved surfaces 16 and 18 have inflection points of inclination. In an alternative arrangement of the present invention, the body 14 can be formed to have a refraction distribution, instead of the surface configuration having inflection points of inclination.

Figure 6A:
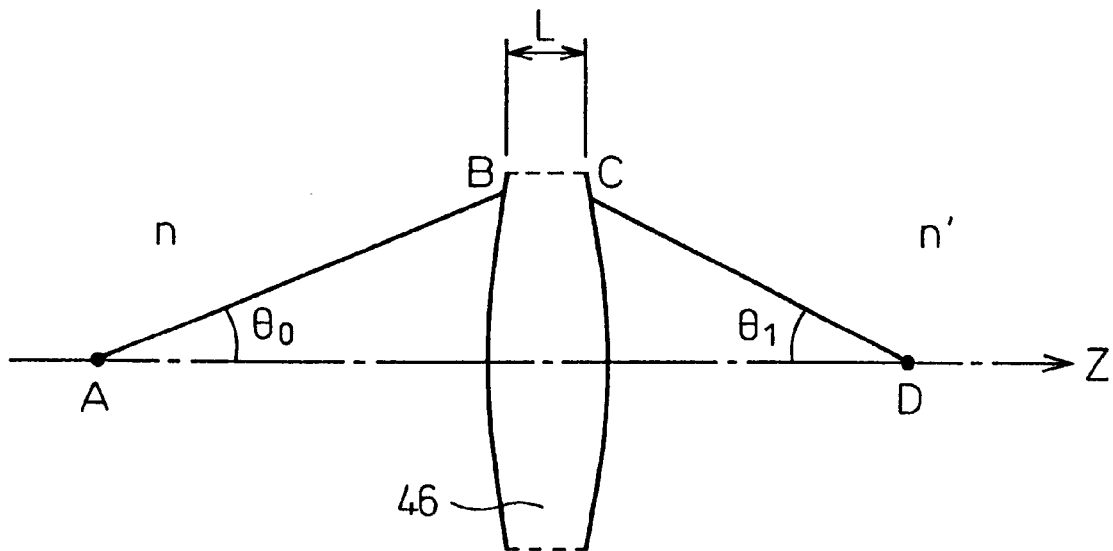
FIGS. 6A and 6B are views illustrating the Law of sines for a lens.
Figure 6B:
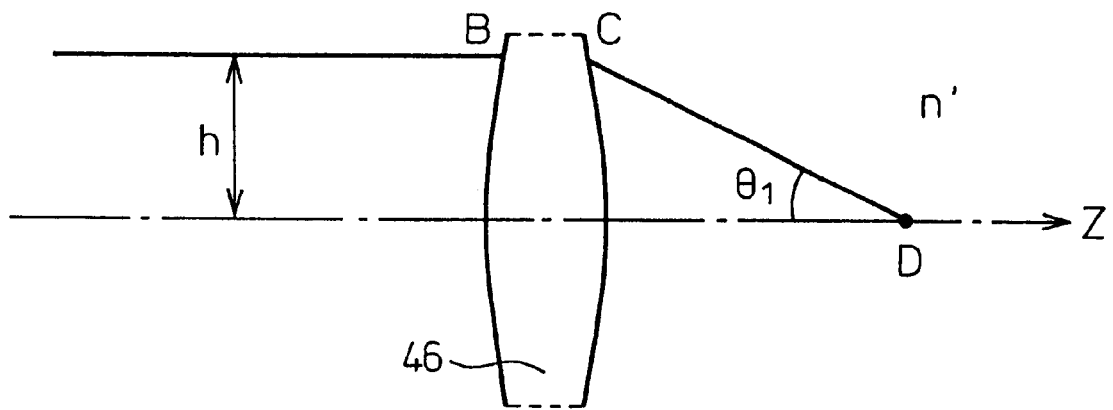

FIGS. 6A and 6B show the law of sines for lens. In FIG. 6A, the Z-axis represents the optical axis direction. Light, emitted from the point A on the Z-axis at the emission angle $\theta_0$, enters an element 46 at the point B. The light is refracted, deflected and transmitted through the element 46 by the distance L, and is refracted and deflected at the point C and emitted therefrom. The light is thereafter converged onto the point D on the Z-axis at angle $\theta_1$. Here, the point A is the object focal point and the point D is the image focal point.

If the light intensity distribution of the light radiated at the point A is symmetric with respect to the Z-axis, the light intensity distribution of the emission light can be converted to be different from that of the incident light by continuously changing the lateral magnification of light beams radiated at different angles $\theta_0$. The lateral magnification $\beta$ is obtained from following equation, $$\beta = (n \sin \theta_0)/(n' \sin \theta_1)$$

where, n represents the refractive index of the medium upon which light is incident and n' represents the refractive index of the medium from which light is emitted. Conventionally, the collimator lens has been produced to satisfy the sine conditions. In the present invention, the light intensity distribution converting device 10, which can be used as a collimator lens, is intentionally prepared so as not to satisfy the sine conditions.

As shown in FIG. 6B, if the object point is infinite, the focal length f is obtained by the following equation, $$f = h/(n' \sin \theta_1)$$

where, h designates the height of the incident light parallel to the Z-axis. The light intensity distribution of the emission light different from that of the incident light can be obtained by changing the values of $h/\sin\theta_1$ at the image point. In either case, the distance L and the refractive angle at the points C and B are selected and the surface of the element is continuous, so that a difference in the optical length of light beams emitted from the object point at different angles between the object point and the image point is not larger than the Rayleigh's limit.

The light intensity distribution converting device 10 of the present invention can convert a given light intensity distribution into an optional continuous light intensity distribution, so that the wave front aberration caused by an axial misalignment or a manufacturing error, such as an irregular thickness, can be reduced. Also, if the device 10 has a lens function, it can be used as a collimator lens and, hence, the number of the elements of an optical apparatus can be reduced. If the body 14 of the light intensity distribution converting element 10 is designed to have an isotropic refractive index, the body can be formed to be symmetrical with respect to the optical axis. Since the light intensity distribution is converted by the refraction, the light absorption or reflection loss can be minimized. As the light path length of the light beams is identical, the spot diameter can be reduced up to the diffraction limit.

Figure 7:
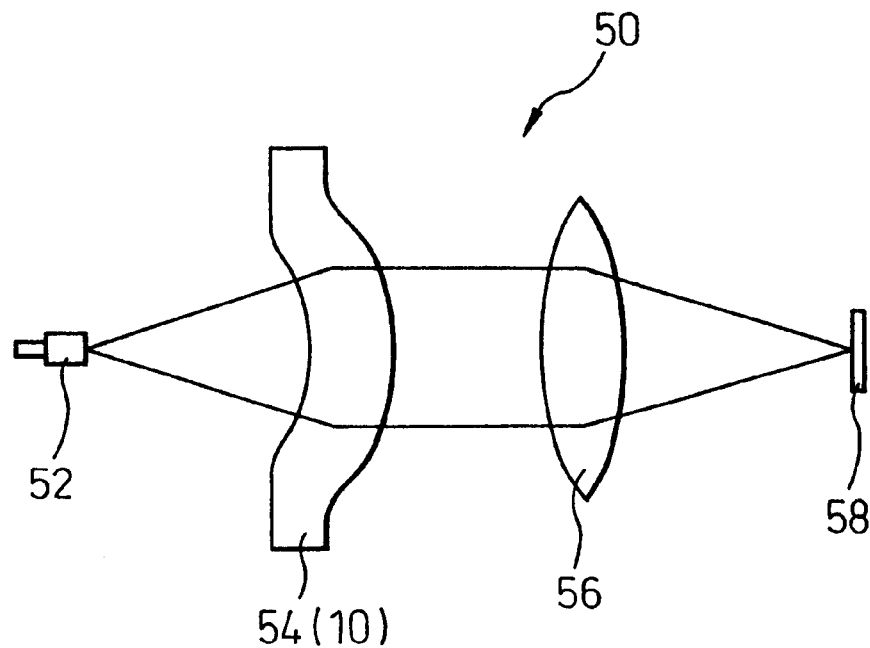
FIG. 7 is a view showing an example of an optical disc apparatus including the light intensity distribution converting device shown in FIGS. 1 and 2.

FIG. 7 shows an optical disc apparatus 50 including the light intensity distribution converting device 10 shown in FIGS. 1 and 2. The optical disc apparatus 50 is provided with a laser source 52, a collimator lens 54, and an objective lens 56. The collimator lens 54 consists of the light intensity distribution converting device 10 explained referring to FIGS. 1 to 3. The advantages expected from this arrangement are as mentioned before. Typically, the laser source 52 radiates diverging light having a Gaussian light intensity distribution. The laser, radiated from the laser source 52, is converted to collimated light having a uniform light intensity distribution by the collimator lens 54 consisting of the light intensity distribution converting device 10. The light is thereafter condensed and made incident upon the disc 58 by the objective lens 56. Consequently, the objective lens 56 can scan the disc 58, using a larger quantity of light of a smaller spot diameter.

Figure 8:
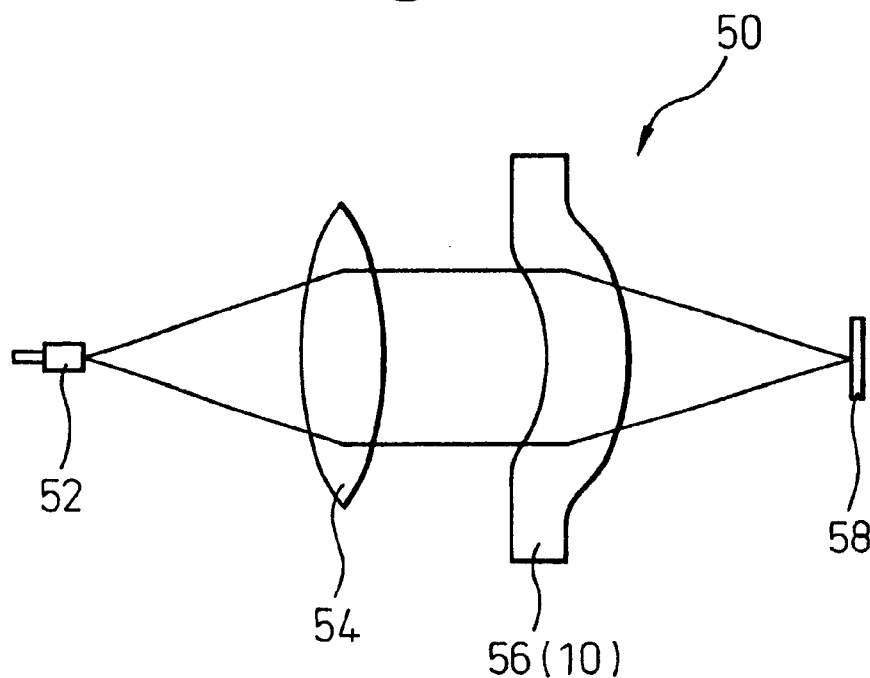
FIG. 8 is a view showing another example of the optical disc apparatus including the light intensity distribution converting device.

FIG. 8 also shows an optical disc apparatus 50 including the light intensity distribution converting device 10. The optical disc apparatus 50 is provided with the laser source 52, the collimator lens 53, and the objective lens 56. The objective lens consists of a light intensity distribution converting device 10 which will be discussed hereinafter. The objective lens 56 can scan the disc 58 with a larger quantity of light of a smaller spot diameter.

Figure 9A:
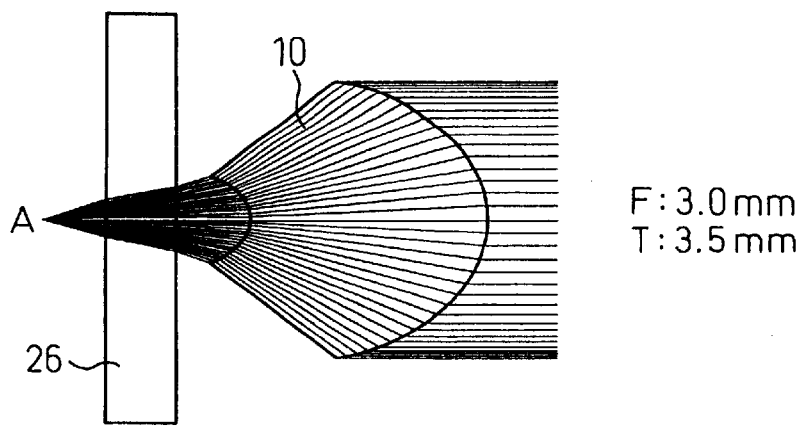
FIGS. 9A to 9C are views showing modified examples of a light intensity distribution converting device.
Figure 9B:
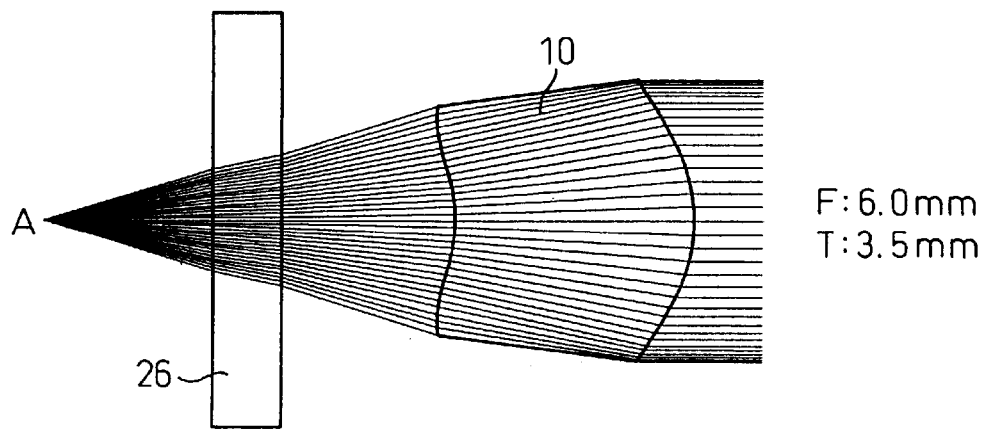
Figure 9C:
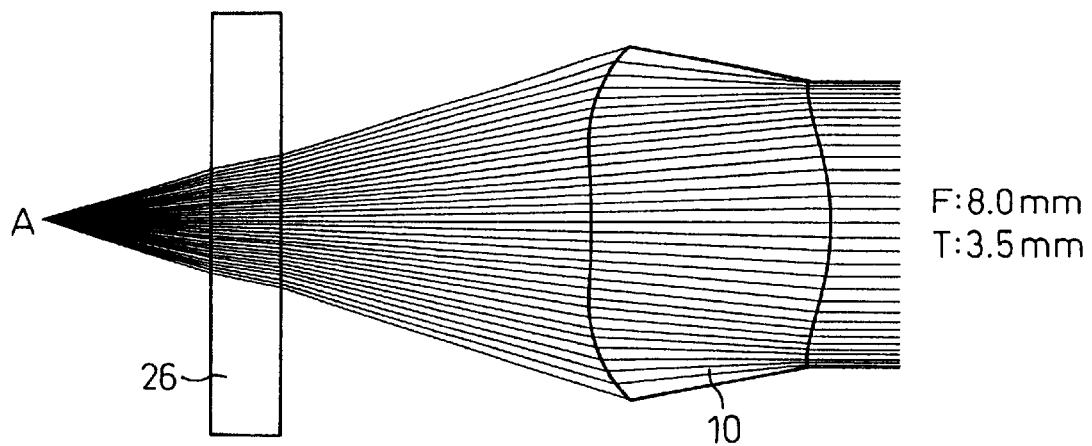

FIGS. 9A to 12C show modified embodiments of the light intensity distribution converting device 10 shown in FIGS. 1 to 3. These examples show various shapes of the light intensity distribution converting device 10 when the distance F between the radiation point A and the light intensity distribution converting device 10 and the thickness T thereof were changed. FIGS. 9A to 9C show shapes of the light intensity distribution converting device 10 when the distance F was changed, while the thickness T was constant. The thickness of the flat plate 26 was 1 mm. The shape of the light intensity distribution converting device differs depending on the distance F between the radiation point A and the device 10. The shorter the distance F, the larger the curvatures of the first and second curved surfaces 16 and 18.

Figure 10A:
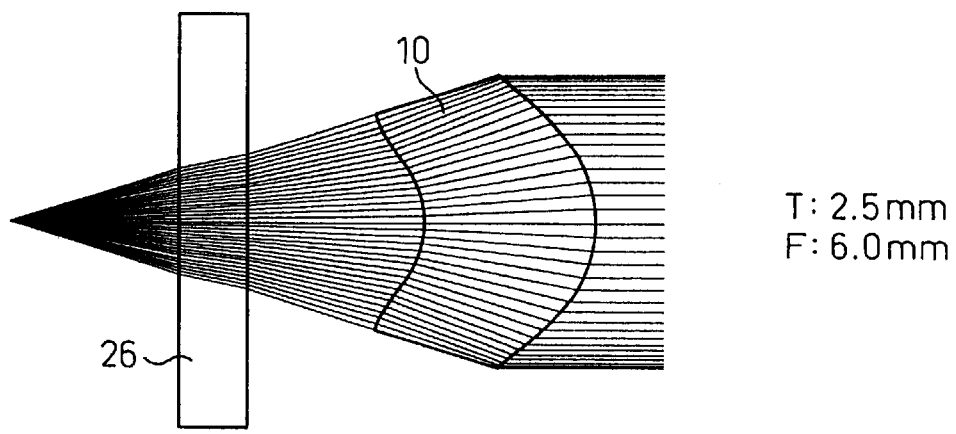
FIGS. 10A to 10C are views showing modified examples of a light intensity distribution converting device.
Figure 10B:
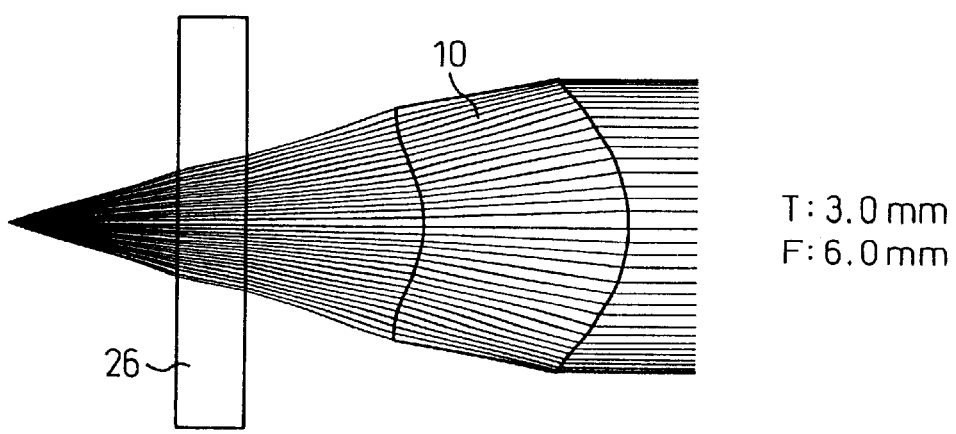
Figure 10C:
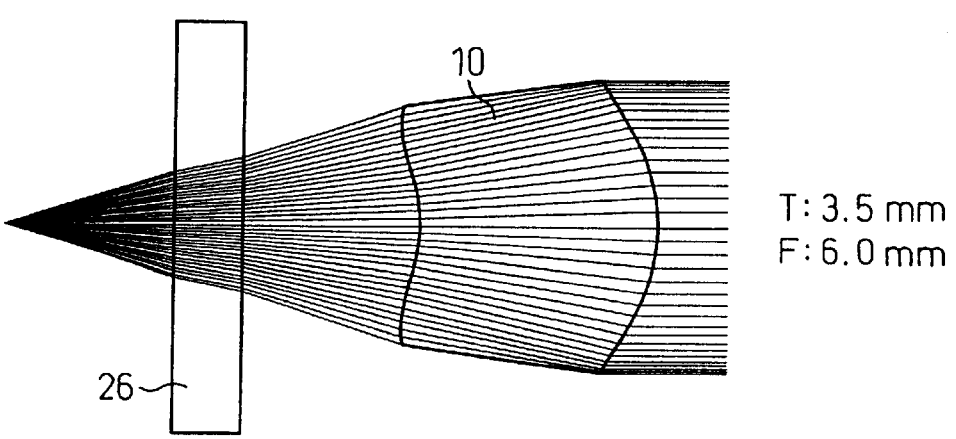
Figure 11A:
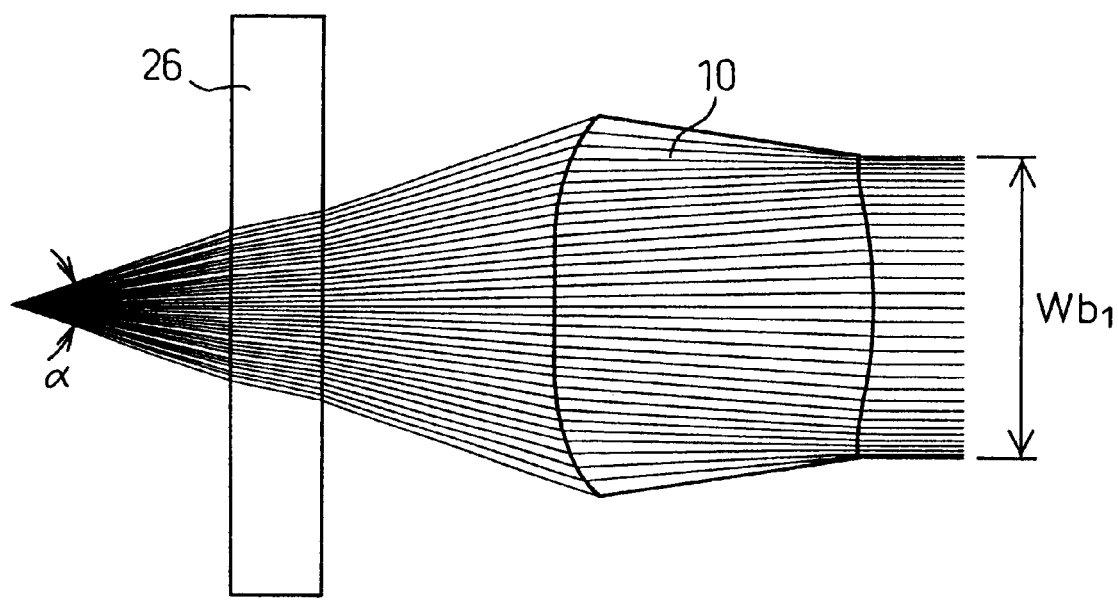
FIGS. 11A and 11B are views showing modified examples of a light intensity distribution converting device.
Figure 11B:
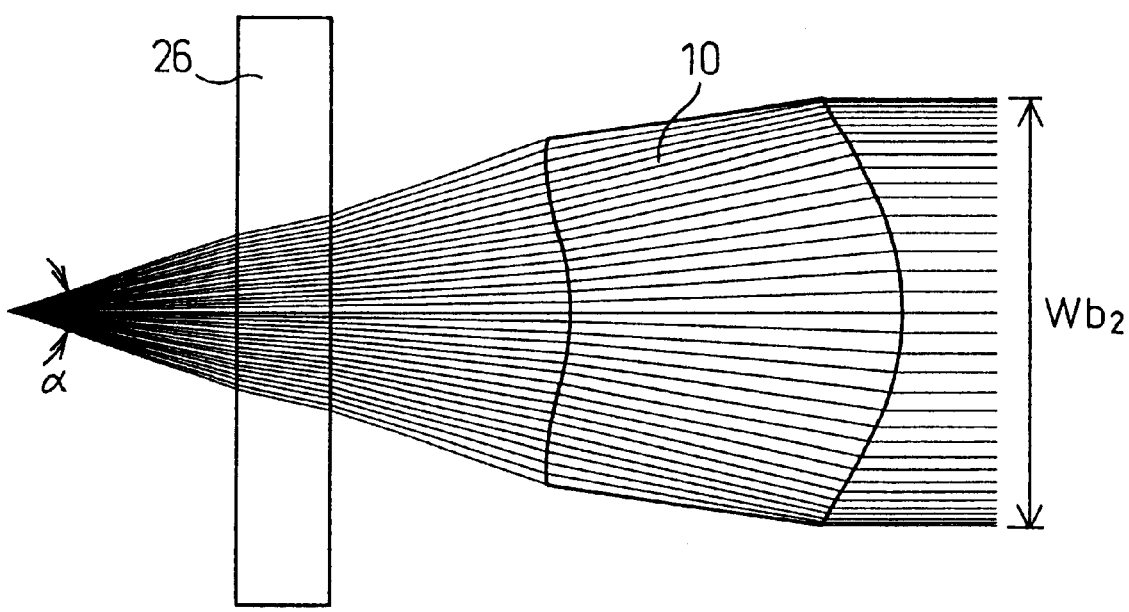

FIGS. 10A to 10C show various shapes of the light intensity distribution converting device 10 when the thickness T was changed while the distance F was constant. The thickness of the flat plate 26 was 1 mm. The shape of the light intensity distribution converting device differs depending on the thickness T of the light intensity distribution converting device 10. The curvatures of the first and second surfaces of 16 and 18 increase as the thickness T decreases. FIGS. 11A and 11B show examples in which the aperture diameters Wb of the light emitting therefrom were different, while the distance F between the radiation point A and the light intensity distribution converting device 10 and the thickness T thereof were constant. In these examples, F was 8.0 mm and T was 3.5 mm. The aperture diameter Wb1 of the emission light in FIG. 11A was 3 mm, and the same Wb2 in FIG. 11B was 4 mm. Note that, half angles α with respect to the aperture diameter Wa of the incident light at the radiation point A were both 18 degrees. Also, in the examples shown in FIG. 9 and FIG. 10, the half angles α were 18 degrees. As can be seen from the foregoing, since the light intensity distribution converting device 10 has a freedom in shape to some extent, an optimum shape light intensity distribution converting device 10 according to the requirements of dimensional precision or an optical system to be used together therewith can be obtained.

Figure 12A:
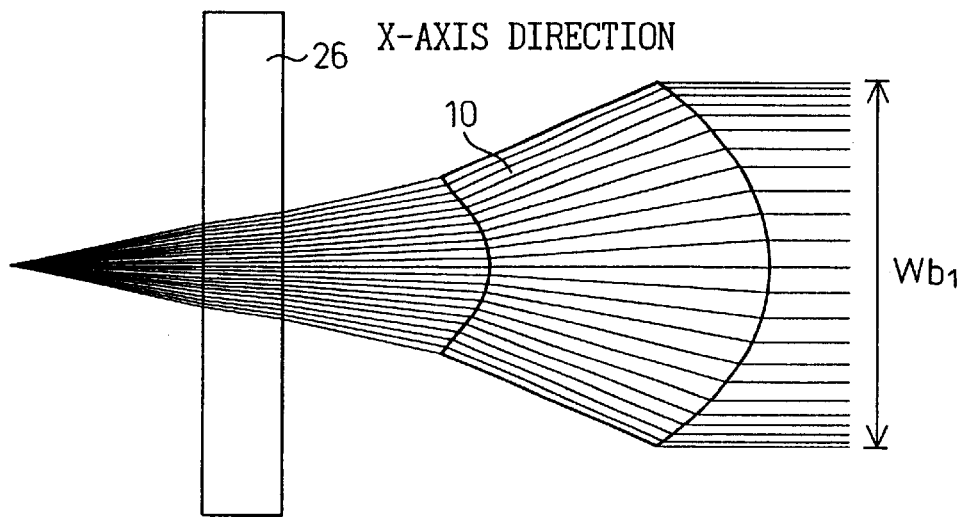
FIGS. 12A to 12C show a modified example of a light intensity distribution converting device.
Figure 12B:
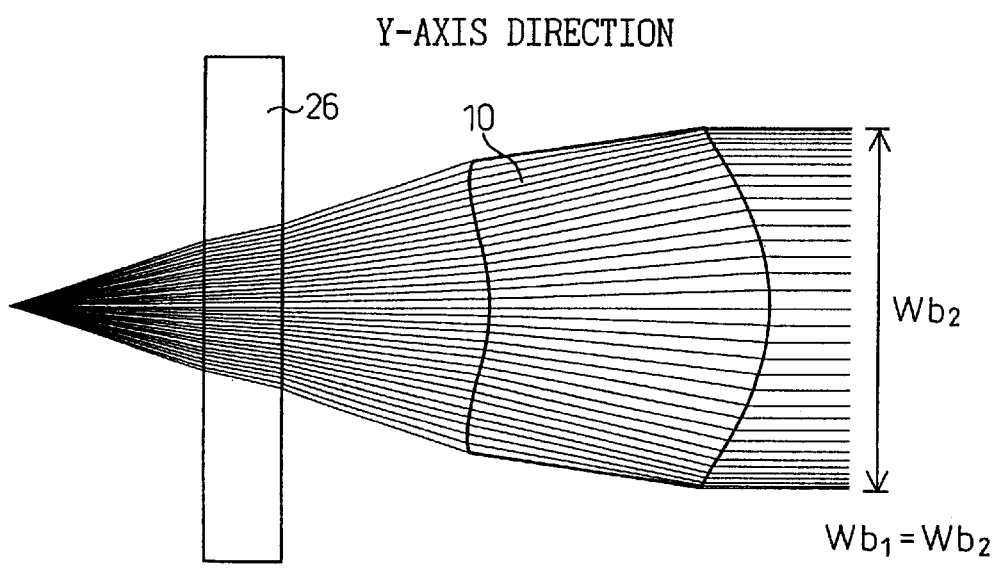
Figure 12C:
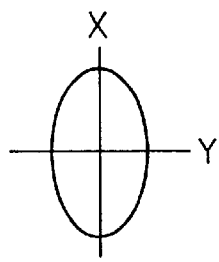

FIGS. 12A to 12C show different examples of the light intensity distribution converting device 10. FIG. 12C shows the emission characteristics at the radiation point A. In this embodiment, the light radiated from the point A has an elliptic light intensity distribution in which the X-axis defines the major axis and the Y-axis defines the minor axis. If the radiation aperture diameters Wb1 and Wb2 in the X-axis direction and in the Y-axis direction are equal, the cross sectional shape of the light intensity distribution converting device 10 in the X-axis direction shown in FIG. 12A is different from that in the Y-axis direction shown in FIG. 12B. Thus, collimated light having a perfect circular uniform light intensity distribution can be obtained from the incident light having an elliptic light intensity distribution.

Figure 13A:
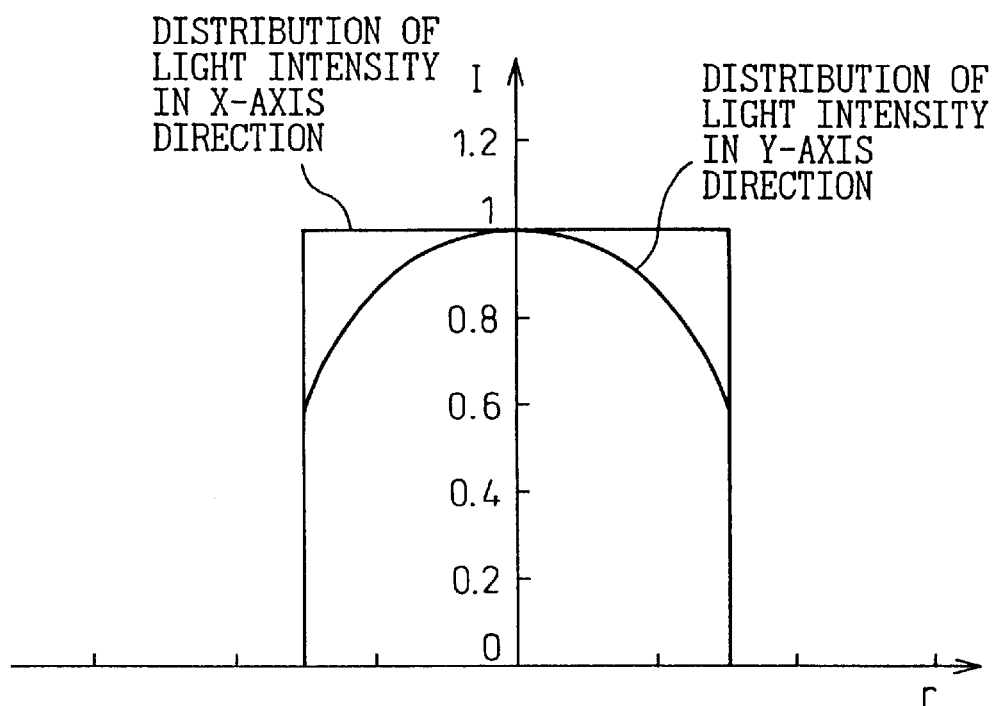
FIGS. 13A and 13B are views showing an example of a light intensity distribution having different characteristics in X-axis and Y-axis directions.
Figure 13B:
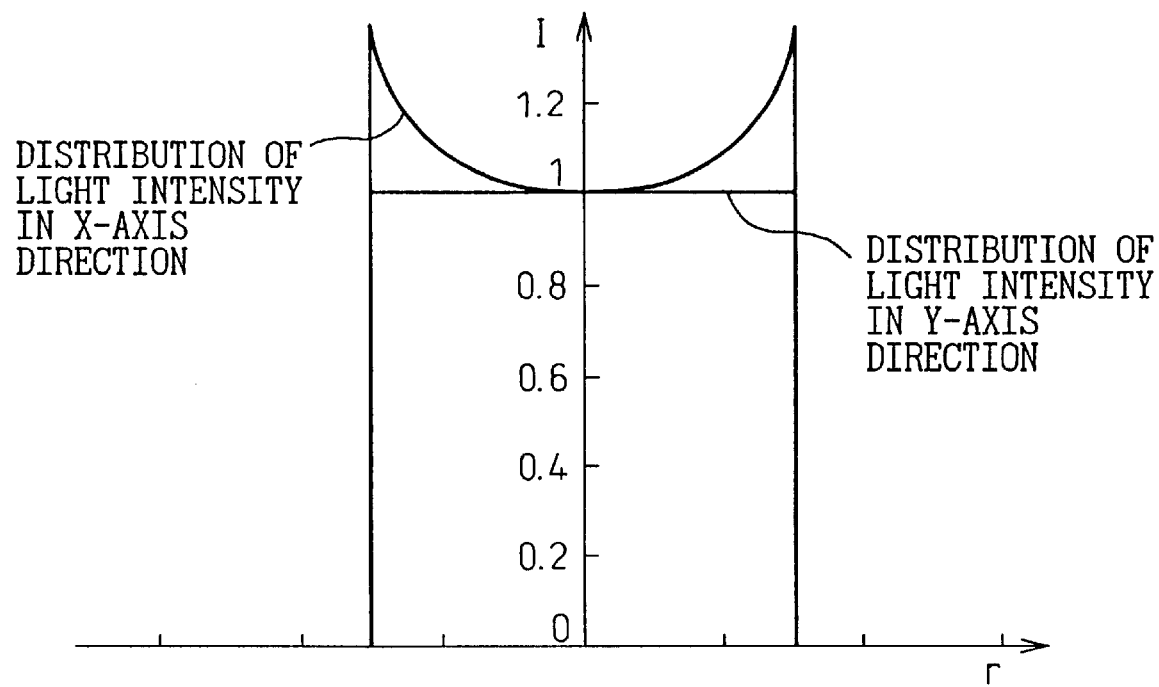

In FIGS. 13A and 13B, in case of the light at the radiation point A having an elliptic light intensity distribution, the light intensity distribution in the X-axis direction can be different from that in the Y-axis direction by making the shape of the light intensity distribution converting device 10 rotation-symmetrical with respect to the Z-axis. For example, as shown in FIG. 13A, while the light intensity distribution in the X-axis direction is uniform, that in the Y-axis direction is of a dome. As shown in FIG. 13B, the light intensity distribution in the Y-axis direction is uniform, but that in the X-axis direction is in the shape of bowl.

Figure 14A:
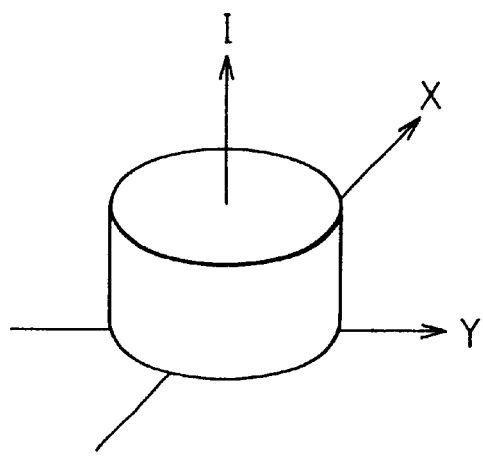
FIGS. 14A to 14C are views showing a different examples of a light intensity distribution.
Figure 14B:
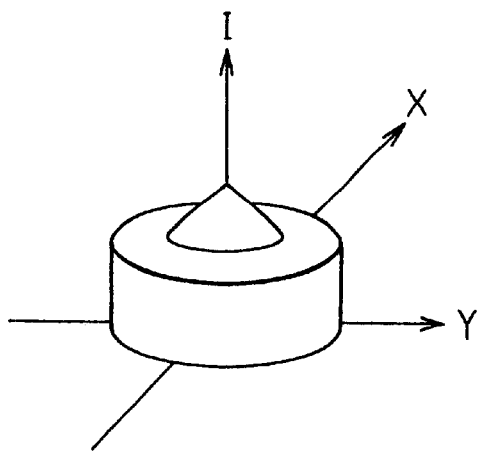
Figure 14C:
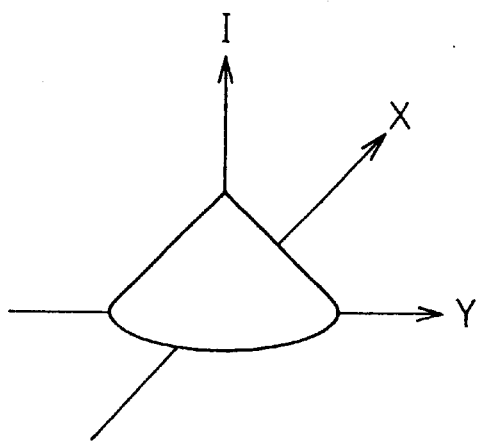

FIGS. 14A to 14C show examples of a variety of converted light intensity distributions. A cylindrical uniform light intensity distribution is shown in FIG. 14A. A light intensity distribution having a combination of a cylinder and a cone, in which the intensity is high particularly at the center thereof is shown in FIG. 14B. A conical light intensity distribution is shown in FIG. 14C. In the present invention, the light intensity distribution converting device 10, which can emit light having various light intensity distributions, can be obtained.

Figure 15:
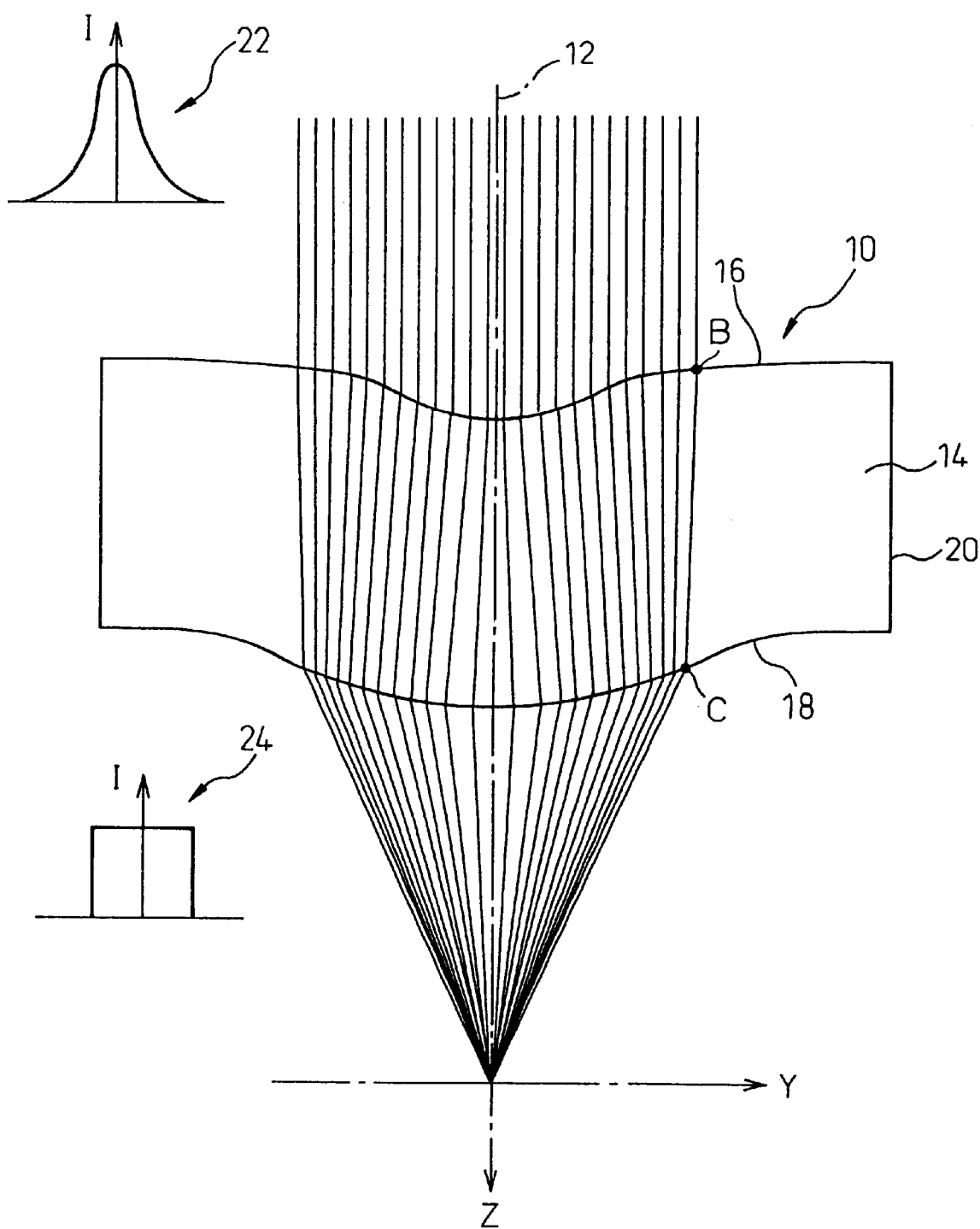
FIG. 15 is a view showing a modified example of a light intensity distribution converting device.

In the above mentioned embodiments, the light intensity distribution converting device 10 has been applied to a collimating type element which converts the diverging light having a Gaussian light intensity distribution on the wave front into the collimated light having a uniform light intensity distribution. The light intensity distribution converting device 10 shown in FIG. 15 is an objective lens type element which converts collimated light having a Gaussian light intensity distribution on the wave front into the converging light having a uniform intensity distribution on the wave front. This type of the light intensity distribution converting device 10, which also can be manufactured in the same process as explained referring to FIGS. 1 to 3, can be used as an objective lens 56 shown in FIG. 8.

Figure 16:
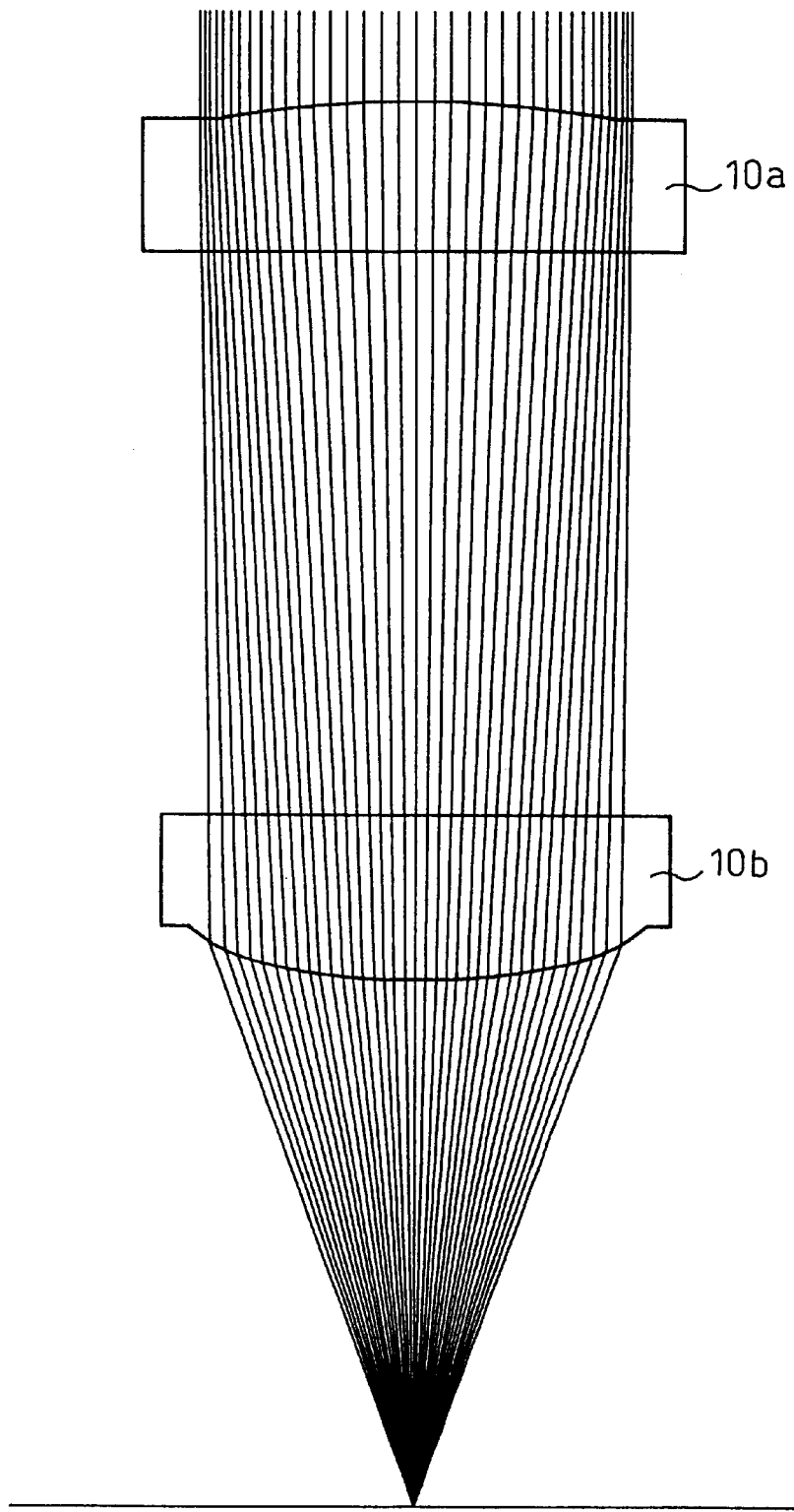
FIG. 16 is a view showing a modified example of a light intensity distribution converting device.

In the aforementioned embodiments, the shape of the device shape is determined so that the wave front aberration is less than the Rayleigh's limit. It is apparent that the light intensity distribution converting device can be applied to an optical system in which the beam spot diameter is not reduced to the diffraction limit. Though the light intensity distribution converting device 10 is made of a single piece in the above mentioned embodiments, it is possible to make the light intensity distribution converting device 10 of two (or more) elements 10a, 10b as shown in FIG. 16. In this alternative, the total thickness T of the device 10 is relatively large to restrict the wave front aberration, but the thickness of each element 10a (10b) can be small, thus resulting in easy production of the device. Also, it is possible to minimize the production error by forming one side of each element 10a, 10b flat, and to minimize the assembling error by utilizing of the aberrations caused by the flat surfaces. Additionally, changing the distance between the two elements 10a, 10b can change the light intensity distribution.

FIG. 17 shows an embodiment of an optical disc apparatus 50 comprised of a light source 52, a collimator lens 54 made of the light intensity distribution converting device 10, and an objective lens 56. The latter is supported by a holder 56a. In this embodiment, the objective lens 56 is disposed within the collimated light, having a uniform light intensity distribution, emitted from the collimator lens 54 (the light intensity distribution converting device 10). Therefore, even if the position of the objective lens 56 is deviated as indicated by 56', as long as the positional deviation of the aperture diameter (Wo) occurs within the aperture diameter Wb of the light emitting from the device 10, a predetermined quantity of light having a uniform light intensity distribution can be always made incident upon the objective lens 56. Consequently, the objective lens 56 can emit a predetermined quantity of light of a small spot diameter. Requirements on the precision of assembling the optical system and drive seeking accuracy of the objective lens 56 can be considerably eased.

Figure 18A:
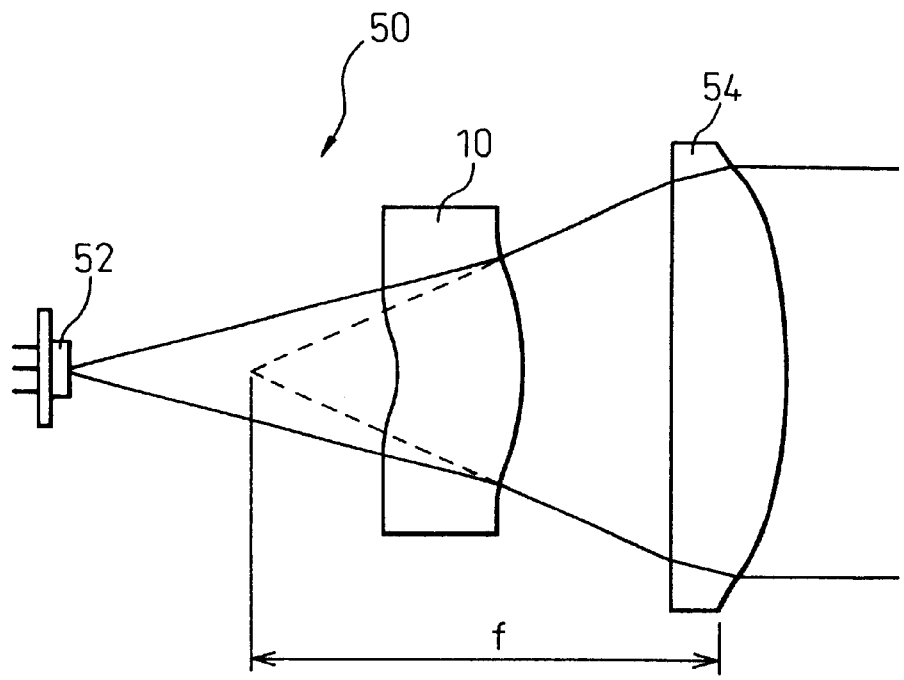
FIGS. 18A and 18B are views showing a modified example of an optical disc apparatus.
Figure 18B:
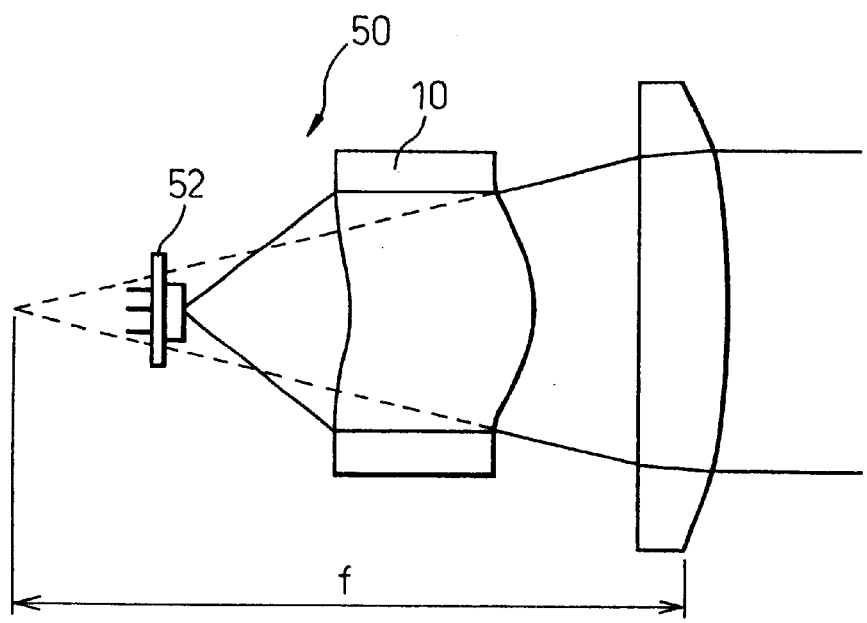

FIGS. 18A and 18B shows another embodiment of an optical disc apparatus 50 provided with the light source 52, the light intensity distribution converting device 10, the collimator lens 54, and the objective lens (not shown in the figure). In this embodiment, the light intensity distribution converting device 10 is disposed between the light source 52 and the collimator lens 54, and converts NA or the divergent angle of the incident light and modifies the light intensity distribution.

In FIG. 18A, the light intensity distribution converting device 10 is arranged so that the diverging light, which enters the light intensity distribution converting device 10, is emitted therefrom at an increased divergent angle. In FIG. 18B, the light intensity distribution converting device 10 is arranged so that the diverging light, which enters the light intensity distribution converting device 10, is emitted therefrom at a reduced diverged angle.

The focal length of the collimator lens 54 is represented by f. In many cases, the distance between the light source 52 and the collimator lens 54 cannot be shortened to provide a necessary axial accuracy. However, in the arrangement shown in FIGS. 18A and 18B, the quantity of light which can be received by the collimator lens 54 can be increased, as if the distance between the light source 52 and the collimator lens 54 were shortened. Consequently, the utilization efficiency and the beam spot diameter can be improved.

Figure 19:
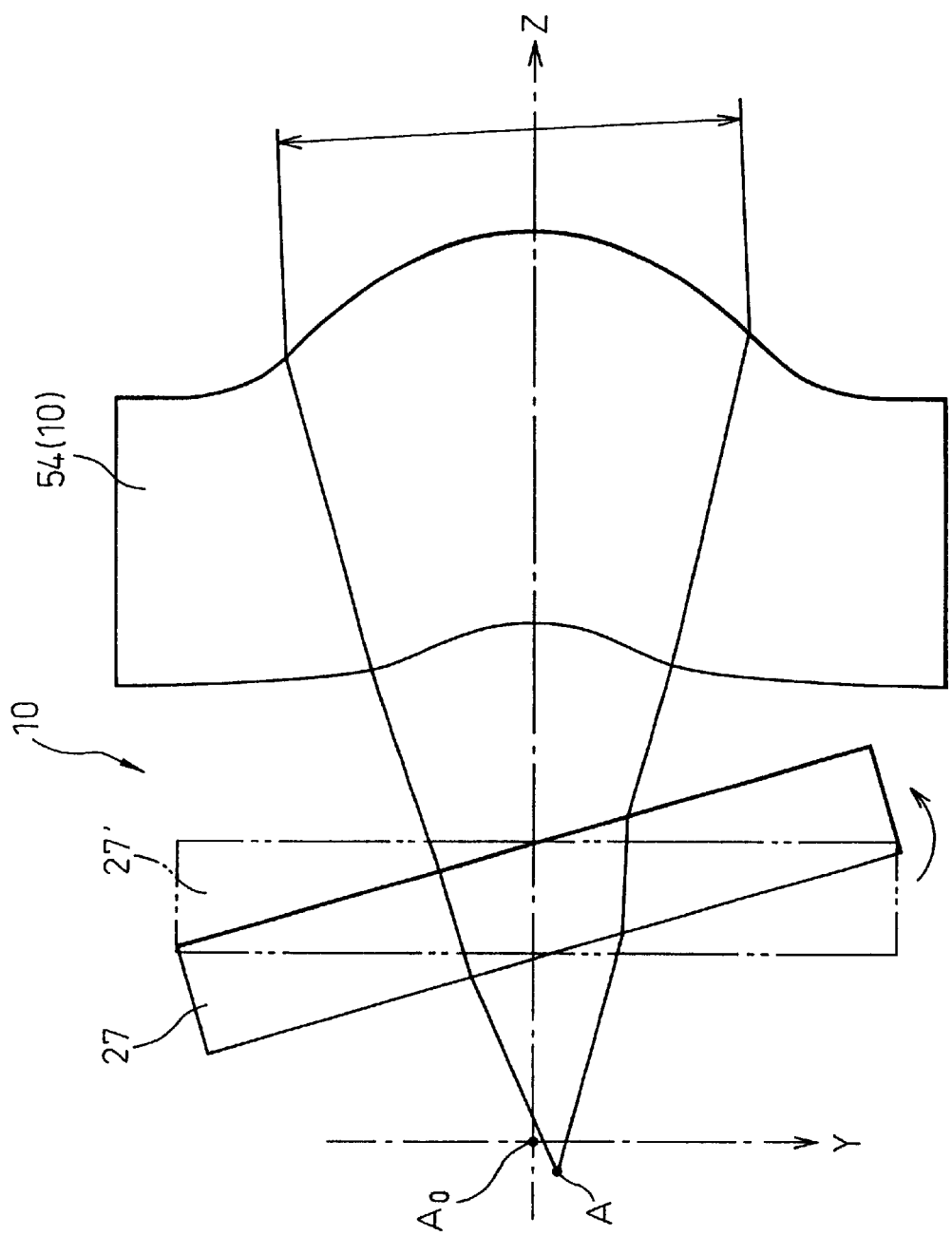
FIG. 19 is a view of a modified example of an optical disc apparatus.

FIG. 19 shows an embodiment of the optical apparatus 50 comprised of a light source 52 (radiation point A), a transparent plane-parallel plate 27, a collimator lens 54 (the light intensity distribution converting device 10), and an objective lens (not shown). In this embodiment, the plane-parallel plate 27, disposed between the light source 52 and the collimator lens 54, is tiltable with respect to the optical axis. A wave front aberration produced at the imaging point located behind the objective lens can be corrected by tilting the plane-parallel plate 27.

If the correct position of the radiation point A is $A_0$, and the correct position of the plane-parallel plate 27 is 27', the deviation of the radiation point A increases the wave front aberration caused at the imaging point located behind the objective lens. To prevent this, the wave front aberration produced at the imaging point after the objective lens is corrected by tilting the plane-parallel plate 27 to adjust the deviation in the optical path length, according to the positional deviation of the point A.

Figure 20:
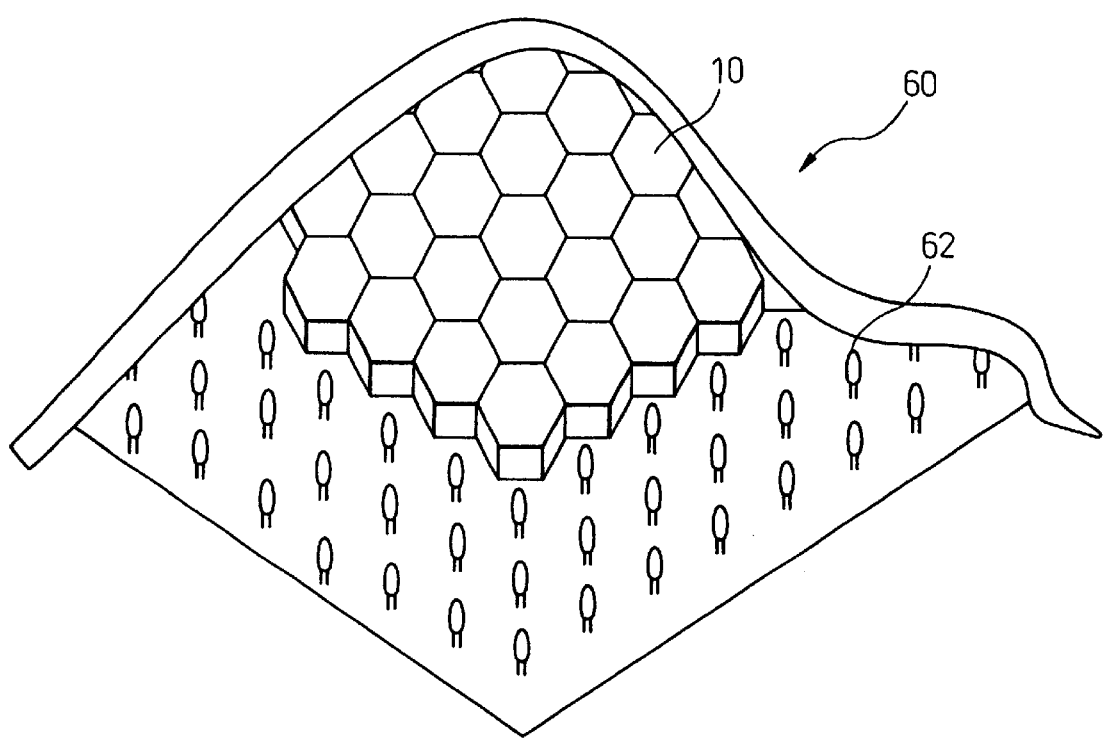
FIG. 20 is a view showing a lighting apparatus including a light intensity distribution converting device.

FIG. 20 shows an embodiment of a lighting apparatus 60 using a light source 62 and the light intensity distribution converting device 10. In this embodiment, the light source 62 composed of light emitters, such as light emitting diodes, is a two-dimensional arrangement, and the light intensity distribution converting devices of a honeycomb shape are arranged corresponding to the light emitters. Each light intensity distribution converting device 10 receives diverging light from the light emitters, and outputs light having a uniform light intensity distribution. Since many light intensity distribution converting devices are disposed in a plane, light having a uniform distribution can be emitted from the same plane. Consequently, the lighting apparatus can be used for, for example, a backlight of a display and can increase the illuminance in a given direction without light quantity loss. Also, because the light which is converged by a lens, etc., does not exhibit a scattered point distribution owing to a uniform light intensity distribution, this lighting apparatus can be used when an LED array or the like is used for a lighting device for a microscope.

As explained heretofore, in the present invention, a light intensity distribution converting device, which can convert an optional light intensity distribution into a desired one, can reduce wave front aberrations and can increase the freedom of design of the beam condensing performance or the spot shape. The device produces strong light and can reduce a loss in the quantity of light. Also, the light intensity distribution converting device can be used in place of a collimator lens which collimates diverging light, or an objective lens which converts collimated light into converging light, and hence not only can the wave front aberrations be restricted but also the shape of a beam spot can be reduced without increasing the number of elements in the optical apparatus.

What is claimed is:

1. An illumination device comprising:
   a plurality of two-dimensionally arranged light sources; and
   a plurality of light distribution converting elements arranged to receive light from said light sources, respectively;
   wherein each of said light intensity distribution converting elements comprises:
   a body including a first curved surface extending transversely of a central axis, a second curved surface extending transversely of the central axis, and an outer circumferential surface extending between said first curved surface and said second curved surface;

one of said first and second curved surfaces having a concave surface configuration at approximately a center portion thereof; and the other having a convex surface configuration at approximately a center portion thereof, wherein said body is constructed such that the incident light with a Gaussian light intensity distribution is converted into an emerging light with an approximately uniform light intensity distribution, due to refraction of light caused while the light passed from the first curved surface to the second curved surface, and wherein an objective lens is arranged as the light intensity converting element.

2. An illumination device comprising:

a plurality of two-dimensionally arranged light sources; and a plurality of light intensity distribution converting elements arranged to receive light from said light sources, respectively;

wherein each of said light intensity distribution converting elements comprises:

a body including a first curved surface extending transversely of a central axis, a second curved surface extending transversely of a central axis, and an outer circumferential surface extending between said first curved surface and said second curved surface;

one of said first and second curved surfaces having a concave surface configuration at approximately a center portion thereof; and the other having a convex surface configuration at approximately a center portion thereof, wherein said body is constructed such that the incident light with a Gaussian light intensity distribution is converted into an emerging light with an approximately uniform light intensity distribution, due to refraction of light caused while the light passed from the first curved surface to the second curved surface, and wherein a collimator lens is arranged as the light intensity converting element.

3. An illumination device comprising:

a plurality of two-dimensionally arranged light sources; and a plurality of light intensity distribution converting elements arranged to receive light from said light sources, respectively;

wherein each of said light intensity distribution converting elements comprises:

a body including a first curved surface transversely extending with respect to a central axis, a second curved surface transversely extending with respect to the central axis, and an outer circumferential surface extending between said first curved surface and said second curved surface;

one of said and second curved surfaces having a concave surfaces configuration at approximately a center portion thereof; and the first and second curved surfaces being formed such that a light intensity distribution of incident light is different from that of emerging light, due to refraction caused while the light passes from the first curved surface to the second curved surface;

wherein the arrangement is such that diverging light with a Gaussian light intensity distribution is converted into parallel light which has such a light intensity distribution that intensity is lower at the central portion and is higher at the peripheral portion.

* * * * *